US 6,736,006 B2

(12) United States Patent
Arias

(10) Patent No.: US 6,736,006 B2
(45) Date of Patent: May 18, 2004

(54) LEVEL DETECTOR FOR A MATERIAL IN A CONTAINER

(75) Inventor: Herman Díaz Arias, Atizapan (MX)

(73) Assignee: TRN Business Trust, Dallas, TX (US)

( * ) Notice: Subject to any disclaimer, the term of this patent is extended or adjusted under 35 U.S.C. 154(b) by 0 days.

(21) Appl. No.: 10/039,080

(22) Filed: Dec. 31, 2001

(65) Prior Publication Data
US 2003/0205085 A1 Nov. 6, 2003

(51) Int. Cl.$^7$ .............................................. G01F 23/00
(52) U.S. Cl. ................................... 73/290 R; 73/304 R
(58) Field of Search .......................... 73/290 R, 301, 73/304 C, 304 R

(56) References Cited

U.S. PATENT DOCUMENTS

| | | | |
|---|---|---|---|
| 1,963,330 A | 6/1934 | Lumme | 73/37 |
| 2,127,422 A | 8/1938 | Phaneuf | 177/311 |
| 3,148,542 A | 9/1964 | Clift, Jr. | 73/308 |
| 3,824,587 A | 7/1974 | Fowler | 340/347 |
| 3,949,606 A | 4/1976 | Blancett | 73/229 |
| 4,051,726 A | 10/1977 | Hastbacka | 73/290 |
| 4,065,968 A | 1/1978 | Sunagawa | 73/313 |
| 4,090,092 A * | 5/1978 | Serrano | 307/116 |
| 4,134,022 A | 1/1979 | Jacobsen | 250/577 |
| 4,242,590 A | 12/1980 | von Tlück | 250/577 |
| 4,290,059 A | 9/1981 | Noyes et al. | 340/624 |
| 4,354,180 A | 10/1982 | Harding | 340/619 |
| 4,422,328 A | 12/1983 | Luchessa et al. | 73/313 |
| 4,427,132 A | 1/1984 | Thomson | 222/23 |
| 4,433,577 A | 2/1984 | Khurgin et al. | 73/290 |
| 4,459,584 A | 7/1984 | Clarkson | 340/624 |
| 4,598,742 A | 7/1986 | Taylor | 141/95 |
| 4,638,305 A * | 1/1987 | Sutton | 340/620 |
| 4,688,028 A | 8/1987 | Conn | 340/625 |
| 4,706,203 A * | 11/1987 | Ramsdale et al. | 364/509 |
| 4,723,122 A | 2/1988 | Maltby et al. | 340/870.38 |
| 4,786,846 A | 11/1988 | Uchida | 318/482 |

(List continued on next page.)

FOREIGN PATENT DOCUMENTS

| | | |
|---|---|---|
| GB | 2 147 697 A | 5/1985 |
| WO | WO 00/02015 | 1/2000 |

OTHER PUBLICATIONS

PCT Notification of Transmittal of the International Search Report or the Declaration and International Search Report re International Appln. PCT/US 01/50966 (6 pages), Sep. 16, 2002.
Notification of Transmittal of International Search Report mailed Sep. 19, 2001 corresponding to International Application No. PCT/US 01/40816 filed May 25, 2001.
Notification of Transmittal of International Search Report mailed Jul 18,m 2003 corresponding to International Application No. PCT/US01/05966 filed Nov. 6, 2001.
Notification of Transmittal of International Search Report mailed Apr. 10, 2003 corresponding to International Application No. PCT/IB02/05314 filed Dec. 12, 2002.

Primary Examiner—Hezron Williams
Assistant Examiner—Rodney Frank
(74) Attorney, Agent, or Firm—Baker Botts L.L.P.

(57) ABSTRACT

A level detector includes a rod probe for positioning at least partially within a container suitable for containing a material. The rod probe has first and second ends. A monitoring device is coupled with the first end of the rod probe. The monitoring device is operable to produce a reading when a ground connector contacts the monitoring device. The reading is based upon whether the second end of the rod probe contacts the material. The reading may also be based upon an electrical impedance of the material when the second end of the rod probe contacts the material.

20 Claims, 2 Drawing Sheets

U.S. PATENT DOCUMENTS

| | | | |
|---|---|---|---|
| 4,859,987 A | 8/1989 | Markus | 340/450 |
| 4,873,863 A | 10/1989 | Bruhl et al. | 73/49.2 |
| 4,888,989 A * | 12/1989 | Homer | 73/304 |
| 4,912,976 A | 4/1990 | Labriola, II | 73/290 |
| 4,950,998 A | 8/1990 | Kramer et al. | 324/674 |
| 4,977,528 A | 12/1990 | Norris | 364/571 |
| 4,983,855 A | 1/1991 | Grimes | 250/577 |
| 4,989,970 A | 2/1991 | Campbell et al. | 356/73 |
| 5,035,581 A | 7/1991 | McGuire et al. | 417/36 |
| 5,042,299 A | 8/1991 | Wells | 73/304 |
| 5,043,912 A | 8/1991 | Reus | 364/509 |
| 5,073,720 A | 12/1991 | Brown | 250/577 |
| 5,105,085 A | 4/1992 | McGuire et al. | 250/343 |
| 5,117,693 A | 6/1992 | Duksa | 73/317 |
| 5,136,883 A | 8/1992 | Jannotta | 73/309 |
| 5,154,079 A | 10/1992 | Lupoli | 73/308 |
| 5,156,048 A | 10/1992 | DeFigueiredo et al. | 73/308 |
| 5,251,482 A | 10/1993 | Bates et al. | 73/290 |
| 5,257,090 A | 10/1993 | Meinzer et al. | 356/358 |
| 5,265,032 A | 11/1993 | Patel | 364/509 |
| 5,275,951 A | 1/1994 | Chow et al. | 436/50 |
| 5,279,157 A | 1/1994 | Mattis et al. | 73/290 |
| 5,297,423 A | 3/1994 | Keating et al. | 73/49 |
| 5,309,212 A | 5/1994 | Clark | 356/5 |
| 5,351,036 A | 9/1994 | Brown et al. | 340/618 |
| 5,351,548 A | 10/1994 | Briggs et al. | 73/718 |
| 5,502,377 A | 3/1996 | Freund | 324/175 |
| 5,535,625 A | 7/1996 | Levy | 73/290 |
| 5,539,670 A | 7/1996 | Maltby et al. | 364/550 |
| 5,609,059 A | 3/1997 | McEwan | 73/290 |
| 5,636,548 A | 6/1997 | Dunn et al. | 73/313 |
| 5,642,097 A | 6/1997 | Martel | 340/618 |
| 5,648,844 A | 7/1997 | Clark | 356/5.09 |
| 5,705,733 A | 1/1998 | Jannotta | 73/1 |
| 5,719,450 A * | 2/1998 | Vora | 307/116 |
| 5,742,055 A | 4/1998 | Lee | 250/353 |
| 5,747,824 A | 5/1998 | Jung et al. | 250/577 |
| 5,751,611 A | 5/1998 | Jamieson | 364/573 |
| 5,755,136 A | 5/1998 | Getman et al. | 73/290 |
| 5,842,374 A | 12/1998 | Chang | 73/290 |
| 5,880,480 A | 3/1999 | Ellinger et al. | 250/577 |
| 5,895,848 A | 4/1999 | Wilson et al. | 73/290 |
| 5,975,102 A | 11/1999 | Schalk | 137/2 |
| 6,040,897 A | 3/2000 | Clifford et al. | 356/4.01 |
| 6,052,190 A | 4/2000 | Sckowski et al. | 356/376 |
| 6,239,709 B1 | 5/2001 | Dykstra et al. | 340/618 |
| 6,253,610 B1 | 7/2001 | Struzik et al. | 73/313 |
| 6,272,911 B1 | 8/2001 | Hinkle | 73/118 |
| 6,336,362 B1 | 1/2002 | Duenas | 73/313 |

\* cited by examiner

LEVEL DETECTOR FOR A MATERIAL IN A CONTAINER

TECHNICAL FIELD OF THE INVENTION

This invention relates to measurement devices, and more particularly to a level detector for measuring the level of a material in a container.

BACKGROUND OF THE INVENTION

Level detection is used in a vast number of applications. High level detectors have special importance for a number of economic and safety reasons. For example, domestic liquid-propane ("LP") gas tanks should not be filled above ninety percent of tank capacity, because heat can raise the pressure inside the tank to dangerous levels.

When filling an LP gas tank, an operator opens a valve at the top of the tank and fills the tank until the valve emits gas in liquid form. This is because the valve is connected to a tube with such a length that only liquid gas can be released when ninety percent of capacity is reached. This process can send polluting gas into the atmosphere thereby endangering the operators and anyone else nearby.

Level detection within tanks of fuels like gasoline oil and liquefied gas can be difficult using electric properties of these fuels because of their high electrical impedance. Furthermore, float sensors are difficult to use because of the erratic movement of the waves generated while filling the tank with these materials.

SUMMARY OF THE INVENTION

The present invention provides a level detector and method of level detection for materials contained in tanks that substantially eliminates or reduces at least some of the disadvantages and problems associated with the previous level detectors and methods.

In accordance with a particular embodiment of the present invention, a level detector is provided. The level detector includes a rod probe for positioning at least partially within a container suitable for containing a material. The rod probe has first and second ends. A monitoring device is coupled with the first end of the rod probe. The monitoring device is operable to produce a reading when a ground connector contacts the monitoring device. The reading is based upon whether the second end of the rod probe contacts the material. The reading may also be based upon an electrical impedance of the material when the second end of the rod probe contacts the material. The ground connector may be a person.

In accordance with another embodiment, a level detector is provided. The level detector includes a rod probe for positioning at least partially within a container suitable for containing a material. The rod probe has first and second ends. A monitoring device is coupled with the first end of the rod probe. The monitoring device includes at least part of a circuit. The circuit has a frequency. The monitoring device is operable to produce a reading when a ground connector contacts the monitoring device. The reading is related to the frequency of the circuit. The frequency may be related to an electrical impedance of the circuit.

Technical advantages of particular embodiments of the present invention include a level detector that displays a reading enabling a user to determine when a material is filled to a particular level within a container. Accordingly, overfilling the container to determine when the container is full of the material is unnecessary.

Another technical advantage of particular embodiments of the present invention includes a level detector that produces a frequency based upon the electrical impedance of the material in the container. Accordingly, a user can determine the type of material in the container based upon the frequency produced by the level detector. Furthermore, a user may be able to determine if there are contaminant materials in the container.

Another technical advantage of particular embodiments of the present invention includes a level detector which uses a rod probe positioned partially within the container to detect the level of the material in the container. Accordingly, installation is less difficult and does not require a wide orifice as a float sensor may require.

Another technical advantage of particular embodiments of the preset invention includes a level detector with a circuit that uses a person as a ground connection to begin current flow through the circuit. Accordingly, less components are needed to operate the level detector.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of particular embodiments of the invention and their advantages, reference is now made to the following descriptions, taken in conjunction with the accompanying drawings, in which.

DETAILED DESCRIPTION OF THE INVENTION

Figure 1:
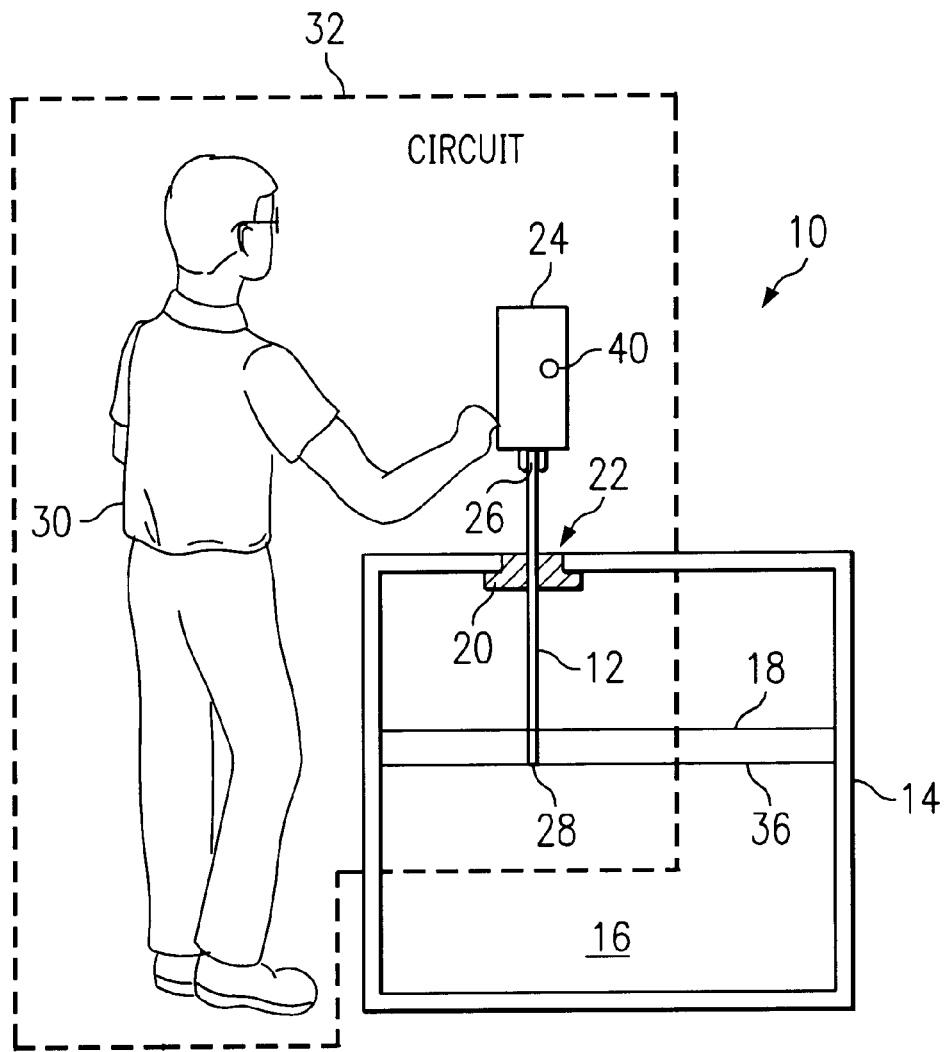
FIG. 1 is a diagram illustrating a level detector and a tank in accordance with an embodiment of the present invention.

FIG. 1 illustrates a level detector 10 in accordance with a particular embodiment of the present invention. Level detector 10 includes a rod probe 12 positioned at least partially within a tank 14. Rod probe 12 has a first end 26 connected to a monitoring device 24 and a second end 28 disposed within tank 14. Rod probe 12 is positioned through a grommet 20 at an opening 22 of tank 14. Tank 14 contains a material 16 having a top surface 18 inside tank 14. Material 16 may be a fluid, such as gasoline oil or LP gas, or any other material suitable to be contained in a container. Monitoring device 24 is coupled with first end 26 of rod probe 14. Monitoring device 24 includes part of a circuit 32.

When a ground connector 30 contacts monitoring device 24, ground connector 30 provides a ground connection for circuit 32. In the illustrated embodiment, ground connector 30 is a person; however, in other embodiments ground connector 30 may comprise any suitable apparatus sufficient to establish a ground connection for circuit 32. When such ground connection is established, an electric path is completed between ground connector 30, monitoring device 24 and rod probe 12; and thus, current flows through circuit 32.

Upon the completion of the electric path, monitoring device 24 produces a reading. The characteristics of the reading depend on whether second end 28 of rod probe 12 is in contact with material 16. If second end 28 of rod probe 12 is in contact with material 16, the characteristics of the reading produced by monitoring device 24 may vary depending on what type of material 16 is contained in tank 14. Level detector 10 enables a user to determine whether top surface 18 of material 16 is at a particular height level in tank 14. A user can make this determination by viewing the characteristics of the reading produced by monitoring device 24, as discussed in greater detail below.

In the illustrated embodiment, rod probe 12 comprises a metal material; however, rod probe 12 may comprise any other suitable conducting material. The size, shape and configuration of rod probe 12 may vary. A user of level detector 10 may choose a particular height level within tank 14 as a reference level in determining the level of top surface 18 of material 16. In the illustrated embodiment, such reference level is labeled as 36; however, the reference level chosen by the user may be any level within tank 14.

The user positions rod probe 12 so that second end 28 is at or below reference level 36 within tank 14. If top surface 18 of material 16 is at or above reference level 36, then second end 28 will contact material 16. Such contact will enable a user to determine when top surface 18 is at or above reference level 36 based on the reading produced by monitoring device 24 when a ground connector is in contact with monitoring device 24. In the illustrated embodiment, the user of level detector 10 may act as ground connector 30.

Tank 14 is made of a metal alloy; however, in other embodiments tank 14 may be made of any other suitable material. Grommet 20 coupled to tank 14 provides isolation for circuit 32. Such isolation prevents circuit 32 from shorting out as a result of contact between rod probe 12 and tank 14 for embodiments where tank 14 includes a conductive material.

As stated above, monitoring device 24 contains part of circuit 32 and produces a reading. In the illustrated embodiment, circuit 32 is a resistance-capacitance ("RC") oscillator circuit which produces an oscillating frequency when the electric path is created between ground connector 30, monitoring device 24 and rod probe 12.

Circuit 32 includes a light-emitting diode ("LED") 40 that displays the reading produced by monitoring device 24. The reading is displayed by the blinking of LED 40 at the oscillating frequency produced by circuit 32. Other embodiments of the present invention may provide for other ways to display the reading. For example, in an alternative embodiment a numerical LED may be used to display the reading produced by monitoring device 24. Furthermore, alternative displays other than LEDs may be used.

When current flows through circuit 32, circuit 32 has a certain electrical impedance, or opposition to current flow. If second end 28 of rod probe 12 contacts material 16 in tank 14, the electrical impedance of circuit 32 changes. This is because material 16 has its own electrical impedance which affects the electrical impedance of circuit 32. The change in electrical impedance of circuit 32 changes the oscillating frequency produced by circuit 32, resulting in a change in the frequency at which LED 40 blinks. Thus, a user of level detector 10 can determine whether second end 28 is in contact with material 16 by observing the frequency at which LED 40 is blinking.

For example, a user may observe LED 40 blinking at a particular frequency when the tank 14 is empty and the electric path is created. Rod probe 12 may be positioned partially within tank 14 so that second end 28 is at reference level 36 within tank 14. Then, material 16 may be added to tank 14. When top surface 18 of material 16 is at or above reference level 36, then material 16 will be in contact with second end 28. At this time, the frequency at which LED 60 is blinking will change. This change will let the user know that tank 14 is filled to reference level 36 with material 16.

Different materials contained in tank 14 affect the electrical impedance of circuit 32 in different ways. Thus, a user may also be able to identify what material is contained in tank 14 according to the particular frequency at which LED 40 is blinking. Moreover, a user may be able to determine if there are contaminant materials within tank 14. For example, in one embodiment of the present invention, liquid-propane ("LP") gas gives a frequency of approximately two hertz. In another embodiment, bond paper gives a frequency of approximately twenty hertz. Various other materials may be contained in tank 14, giving off varying frequencies.

Figure 2:
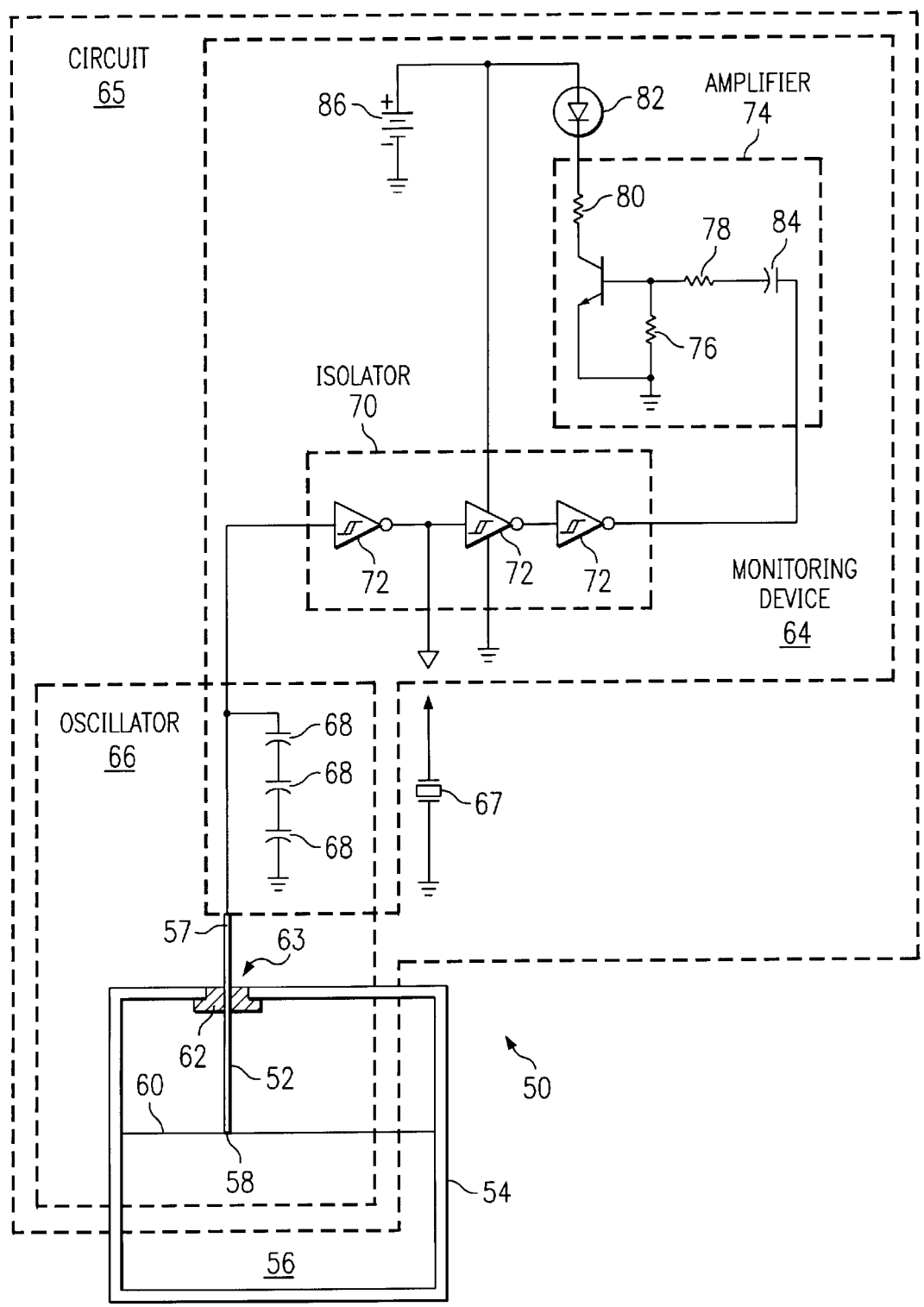
FIG. 2 is schematic diagram illustrating a circuit of a level detector in accordance with an embodiment of the present invention.

FIG. 2 is a schematic diagram illustrating certain components of a level detector 50 in accordance with another embodiment of the present invention. Level detector 50 includes rod probe 52 positioned partially within tank 54. Rod probe 52 has a first end 57 and a second end 58. Second end 58 is disposed within tank 54. Tank 54 contains a material 56 having a top surface 60. Rod probe 52 is positioned through grommet 62 which is coupled to tank 54 at an opening 63 of tank 54.

First end 57 of rod probe 52 is connected to a monitoring device 64. Monitoring device 64 contains part of a circuit 65. In the illustrated embodiment, circuit 65 includes an oscillator 66, a ground connector 67, an isolator 70, an amplifier 74, an LED 82 and a power source 86. Monitoring device 64 also contains part of oscillator 66. Oscillator 66 comprises capacitors 68, rod probe 52 and material 56. In the illustrated embodiment, oscillator 66 includes three capacitors 68, but other embodiments may include one, two or more than three capacitors. Capacitors 68 diminish the current loss through circuit 65. Capacitors 68 are of a low-leakage type.

Monitoring device 64 also contains isolator 70. Isolator 70 aids in isolation between oscillator 66 and amplifier 74, which is discussed below, when current flows through circuit 65. In the illustrated embodiment, isolator 70 includes three Schmidt trigger CMOS gates 72. However, other embodiments may have isolators that include other types of components.

Monitoring device 64 also includes amplifier 74. Amplifier 74 includes resistors 76, 78 and 80. Resistors 76 and 78 perform current amplification, and resistor 80 sets the current for LED 82. Capacitor 84 eliminates the need for a power switch to activate LED 82. Power source 86 provides power to circuit 65.

Ground connector 67 provides a connection to ground for circuit 65 when ground connector 67 contacts monitoring device 64. Ground connector 67 may be a person or any suitable apparatus sufficient to establish a connection to ground for circuit 65. When a connection to ground is established, current flows through circuit 65.

LED 82 blinks at the frequency produced by oscillator 66. If second end 58 of rod probe 52 contacts material 56, then the electrical impedance of oscillator 66 is affected, and the frequency at which LED 82 blinks changes. By observing this change, a user of level detector 50 can determine when top surface 60 of material is at or above the reference level of second end 58. By observing such frequency, a user may also be able to determine the type of material in contact with second end 58 of rod probe 52.

Although the present invention has been described in detail, various changes and modifications may be suggested to one skilled in the art. It is intended that the present invention encompass such changes and modifications as falling within the scope of the appended claims.

What is claimed is:

1. A level detector, comprising:

a rod probe for positioning at least partially within a container suitable for containing a material, the rod probe having first and second ends;

a monitoring device coupled with the first end of the rod probe, and the second end being positionable at a preselected reference level within the container;

the rod probe and the monitoring device being electrically coupled and cooperating to form a portion of an electrical circuit;

the electrical circuit being configured to produce an oscillating frequency in response to an electrical coupling being formed between the electrical circuit and a human body; and wherein the oscillating frequency is equal to a first value if a height of the material is below the reference level, and the oscillating frequency is equal to a second value if the height of the material is above the reference level.

2. The level detector of claim 1, wherein the oscillating frequency is based upon an electrical impedance of the material when the second end of the rod probe contacts the material.

3. The level detector of claim 1, wherein the rod probe is positioned within an isolation grommet; and wherein the isolation grommet is coupled to the container at an opening of the container.

4. The level detector of claim 1, wherein the monitoring device comprises a light-emitting diode (LED) operable to display a reading that corresponds to the oscillating frequency.

5. The level detector of claim 1, wherein the monitoring device comprises at least part of an oscillation circuit.

6. The level detector of claim 1, wherein the material is liquid-propane gas.

7. A level detector, comprising:

a rod probe for positioning at least partially within a container suitable for containing a material, the rod probe having first and second ends;

a monitoring device coupled with the first end of the rod probe, the monitoring device comprising at least part of a circuit;

the circuit being configured such that an electrical coupling with a human body provides a ground that completes the circuit, the circuit having a frequency; and wherein the monitoring device is operable to produce a reading corresponding to the frequency of the circuit.

8. The level detector of claim 7, wherein the frequency is related to an electrical impedance of the circuit.

9. The level detector of claim 8, wherein the electrical impedance of the circuit changes when the second end of the rod probe contacts the material.

10. The level detector of claim 7, wherein the circuit comprises an oscillator.

11. The level detector of claim 7, wherein the circuit comprises an isolator.

12. The level detector of claim 7, wherein the circuit comprises an amplifier.

13. The level detector of claim 7, further comprising a light-emitting diode (LED) operable to display the reading.

14. The level detector of claim 7, wherein the material is liquid-propane gas.

15. A method for detecting a level of a material in a container, comprising:

positioning a rod probe at least partially within a container, the rod probe having first and second ends such that the second end of the rod probe is disposed at a predetermined reference level;

connecting a monitoring device to the first end of the rod probe wherein the rod probe and the monitoring device are electrically coupled and form at least part of an electrical circuit;

selectively completing the circuit by forming an electrical coupling between the monitoring device and a human body to produce a reading of the monitoring device; and inserting material into the container until the reading changes value based upon contact between the material and the second end of the rod probe.

16. The method of claim 15, wherein the reading is based upon the electrical impedance of the material when the second end of the rod probe contacts the material.

17. The method of claim 15, wherein the material is liquid-propane gas.

18. The method of claim 15, wherein:

the circuit has a frequency; and the reading is related to the frequency of the circuit.

19. The method of claim 18, wherein the frequency is related to an electrical impedance of the circuit.

20. The method of claim 19, wherein the electrical impedance of the circuit changes when the second end of the rod probe contacts the material.

* * * * *